US006952231B1

(12) United States Patent
Paavola et al.

(10) Patent No.: US 6,952,231 B1
(45) Date of Patent: Oct. 4, 2005

(54) APPARATUS BASED ON A TELECENTRIC IMAGING SYSTEM FOR FORMING AN IMAGE OF A LINEAR ZONE OF AN OBJECT

(75) Inventors: Jyri Paavola, Kerava (FI); Lasse Lindström, Nummela (FI)

(73) Assignee: Oy Ekspansio Engineering Limited, (FI)

( * ) Notice: Subject to any disclaimer, the term of this patent is extended or adjusted under 35 U.S.C. 154(b) by 864 days.

(21) Appl. No.: 09/675,548

(22) Filed: Sep. 28, 2000

(30) Foreign Application Priority Data

Sep. 28, 1999  (FI)  ................................... 19992069

(51) Int. Cl.[7] .......................... H04N 5/225; H04N 7/18; G01B 11/02; G01B 11/28; G02B 13/22
(52) U.S. Cl. ........................ 348/335; 348/92; 348/142; 356/630; 356/503; 359/663
(58) Field of Search ............................ 348/86, 92, 131, 348/135, 142, 291, 335, 348; 356/452, 496, 356/504, 630, 635, 238.2, 237.2, 237.3, 503; 359/663

(56) References Cited

U.S. PATENT DOCUMENTS

| | | | |
|---|---|---|---|
| 4,123,169 A * | 10/1978 | Merilainen et al. | ......... 356/639 |
| 4,770,537 A | 9/1988 | Koskenohi | |
| 4,851,698 A | 7/1989 | Hippenmeyer | |
| 5,008,743 A | 4/1991 | Katzir et al. | |
| 5,414,551 A | 5/1995 | Okazaki et al. | |
| 5,666,204 A * | 9/1997 | Koskenohi | ................... 356/609 |
| 5,680,219 A * | 10/1997 | Rydningen | ................... 356/635 |
| 6,100,986 A * | 8/2000 | Rydningen | ................... 356/630 |
| 6,324,016 B1 * | 11/2001 | Luster | ......................... 359/663 |

FOREIGN PATENT DOCUMENTS

| | | | | |
|---|---|---|---|---|
| EP | 03 020777 | | 1/1991 | |
| FI | 54972 | | 4/1979 | |
| JP | 62137504 A | * | 6/1987 | ........... G01B 11/04 |
| JP | 08304032 A | * | 11/1996 | ........... G01B 11/06 |
| NO | 152987 | | 9/1985 | |
| WO | 94/24515 | | 10/1994 | |
| WO | 94/24516 | | 10/1994 | |

OTHER PUBLICATIONS

Kane, J.; "Telecentric Lenses: What You Need to Know?"; Computer Optics Inc.; 1999-2002; <http://www.computeroptics.com/telecentric.html>.*

* cited by examiner

Primary Examiner—Wendy R. Garber
Assistant Examiner—John M. Villecco
(74) Attorney, Agent, or Firm—Andrus, Sceales, Starke & Sawall, LLP (57) ABSTRACT

The invention relates to an apparatus based on the telecentric imaging system for forming an image of a linear zone (17) of an object (1). The apparatus comprises a non-telecentric camera (9) consisting of an objective (8) and an image plane (19) formed by a row of photosensitive cells (15) as well as telecentric imaging means (18) between the objective and the object. The telecentric means comprise a concave strip mirror (6), which is aligned with said row of cells and with the aperture of said objective located in its focal plane, as well as a strip-like plane mirror (5) between the parabolic mirror and the objective, whereby the radiation being reflected from the objective continues via the parabolic mirror and the planar mirror further to the objective and from there to the image plane. In the apparatus there is further a scattered light source (7) which lightens the object. The apparatus is adapted for measuring the dimensions of the width parts of the object.

21 Claims, 4 Drawing Sheets

APPARATUS BASED ON A TELECENTRIC IMAGING SYSTEM FOR FORMING AN IMAGE OF A LINEAR ZONE OF AN OBJECT

BACKGROUND OF THE INVENTION

The invention relates to an apparatus based on the telecentric imaging system for forming an image of a linear zone of an object, the apparatus comprising: a non-telecentric camera consisting of an objective and an image plane formed by a row of photosensitive cells; telecentric imaging means which are located between the objective and the object and which comprise a concave strip mirror, which is substantially parallel with said row of cells and in whose focal plane the aperture of said objective is located, the concave strip mirror and the objective forming jointly telecentrically an image of the object on the row of photosensitive cells; and a light source generating a radiation which is directed to the object. The invention also relates to a method for forming a telecentric image of an opaque object located on an opaque and non-reflective substrate with the telecentric system, in which: diffused light is allowed to be directed to the object over its entire width to be inspected; radiation reflected from the object is collected with the concave strip mirror and is allowed to be rereflected as a bundle of rays from the concave mirror; in said reflective bundle of rays, a camera consisting of an objective and a row of photosensitive cells is disposed with the objective aperture located in the focal plane of the concave strip mirror, so that the concave strip mirror and the objective jointly form a telecentric image of a linear strip of the object on the row of photosensitive cells.

A typical optical monitoring apparatus consists of a radiation source and a camera consisting of an objective and an image plane. The image of the object formed by the objective on the image plane can be monitored and stored e.g. by means of a CCD cell, which converts the image into an electric signal in a conventional manner. A CCD cell consists of photosensitive elements placed in matrix configuration, e.g. 256×256 elements. Then the properties of the camera resembles a conventional photographing camera. However, the matrix of the CCD cell can have e.g. the shape of 1024×1 or 2048×1, whereby the cell elements will be located in one single linear row. A camera comprising a linear CCD cell is commonly called a line camera. For the entire object to be measured, either the object or the camera must be movable relative to one another. The illumination is usually carried out as top illumination.

Conventional camera optics sees the object differently depending on the location of the object in the measured area. At the optical axis of the objective, i.e. the central area of the object, the object is seen at right angles by the camera, whereas its lateral areas are viewed at oblique angles, which grow as the distance between the camera and the optical axis grows. This is the so-called central perspective. In addition, when the width of e.g. a material to be cut or sawn, such as boards, is monitored, the edges of the cut/sawn zones produce shadows which interfere with the measurement, so that the width measuring system may interpret the shadow as the edge of the strip. In the case of sawing e.g. a log of timber, the distance from the object to the lens also varies as a result of the three-dimensional object, and then the areas of the object which are located at a greater distance from the camera, such as the lateral zones of a log, are seen in a smaller size than the central zone.

Perspective errors can be corrected with the aid of a telecentric objective. Then all the rays emanated from the object will be parallel with the optical axis and all the points of the object are seen in the same plane perspective. In telecentric objectives, the lens closest to the object must have a width at least equal to that of the object, and thus opticals consisting of conventional lenses may become heavy and bulky. In order to provide an apparatus which is at least compact enough to be useful, the problem consists in the high f-number required, involving in turn the use of lenses made of costly special glass and having a strong curvature, i.e. a small radius of curvature. In addition, a plurality of such lenses is needed in one single optical apparatus for adequate correction of the optical imaging errors of lenses with strong curvatures and a large diameter, resulting in a further increase of the price of the opticals.

U.S. Pat. No. 5,008,743 uses a planar Fresnel plastic lens as a means for achieving telecentric imaging together with a conventional camera and objective, involving a less expensive solution. Due to their optical properties resulting from their discontinuous design, these lenses produce color errors and considerably impaired image quality. Due to the color error, different colors are imaged from the same point of the object on the surface of the CCD cell on mutually different photosensitive measuring elements. This obviously results in a larger measuring error. A measuring error caused by a color error can be corrected with the use of a color filter on the radiation path, so that part of the spectrum is removed by filtering. Nonetheless, filtering reduces the intensity of the radiation emitted by the object, and light sources with higher power must consequently be used. This results in a further increase of the price of the system. A color error can be corrected also by means of programming, as described in this specification. Despite this, the measuring error will be greater than it would be if the object were inspected and measured with appropriately corrected opticals.

U.S. Pat. No. 4,851,698 describes a telecentric imaging arrangement using a row of photosensitive diodes on an image plane on which an image of a strip-like zone of the object is formed with a conventional objective and a strip-like concave mirror with a spherical surface placed between the objective and the object, the objective pupil being placed in the focal plane of the mirror. The solution of this specification also comprises a beam divider in front of the objective, the radiation emitted by a linear light source being reflected through the beam divider and through the strip-like concave spherical mirror to the object. Thus the illumination takes place with the same optical arrangement as the imaging, with the exception that the radiations pass in opposite directions and are separated in the beam divider. In addition, in the arrangement of this specification, the object is placed on a retroreflective substrate for the object to be clearly distinct from the background. The arrangement described here has the major drawback of the imaging errors of the spherical concave mirror, the errors being the same as in lenses, apart from dispersion. Consequently, several lenses must be added to the design described in the specification in order to correct the imaging errors, in a manner similar to lens opticals, whenever good image quality is required, thus resulting in a construction which is at least expensive, although slightly lighter, owing to the larger lens having been replaced with a mirror. What is more, the beam divider used in the solution of the specification is no ideal component, causing part of the radiation from the light source to be dispersed directly from the beam divider through the objective over the photosensitive surface, resulting in turn in a notably lower contrast of the image of the object, and this is obviously the reason why a retroreflective substrate is used in this specification.

BRIEF SUMMARY OF THE INVENTION

The main objective of the invention is to provide an apparatus forming a telecentric imaging system, by means of which optical imaging errors and especially color errors, i.e. dispersion are avoided as much as possible, and which involves a relatively small size and relatively light-weight design, which is also less expensive than conventional telecentric objectives. A second objective of the invention is such an apparatus forming a telecentric imaging system, which produces a high-contrast image of a diffusingly reflective object located on a diffusingly reflective substrate, i.e. the intrinsic contrast differences of the object should be sufficient to form an image which can be interpreted. A third objective of the invention is an illuminating arrangement associated with the apparatus forming a telecentric imaging system, which provides illumination of the object which is sufficiently homogenous and free of shadows, and which does not affect the telecentric imaging system.

The drawbacks described above are eliminated and the objectives defined above are achieved with the apparatus of the invention, which is characterized by the features defined in the claims and the method of the invention, which is characterized by the features defined in the claims.

It has now been surprisingly found in accordance with the invention that with the use of a concave curved mirror with a parabolic surface, with the camera objective placed in its focal plane or in the vicinity of its focal plane, a first-rate telecentric imaging system is achieved which is almost totally free of imaging errors. Parabolic mirrors, i.e. mirrors in the shape of a concave surface formed by a parabola rotated about its axis, have indeed been used in astronomic telescopes. Nevertheless, parabolic mirrors have not been used at all e.g. in the manufacture of camera objectives, unlike spherical mirrors, nor in other imaging systems intended for objects on the earth, because the imaging errors of a parabolic mirror with respect to rays from the outside having a different direction than that of the parabolic axis, are notably greater than in a spherical mirror. The production costs of a parabolic mirror are also very high. In the method of the invention, the mirror is strip-like, and is thus better adapted for a line camera. The production costs of a strip-like mirror are also moderate. In one embodiment of the invention, the strip-like concave mirror is parabolically shaped in one direction and planar in a direction perpendicular to the this first direction, i.e. it is a planar-parabolic mirror, which has quite economical production costs and still very high light-collecting efficiency. In addition, by disposing a strip-like planar mirror between the concave mirror and the camera in accordance with the invention, an apparatus with relatively compact dimensions is achieved. In accordance with the invention, the apparatus is used i.e. in the sawmill industry in the measurement of the width of boards cut from logs, or in any similar manufacture, to measure the width of strips cut from a moving object. Optimization of the width of boards or other strip-like objects is important, because this yields maximum profit of the sawn goods. There will also be less reclamation, because the quality control will be enhanced and more accurate. On the other hand, changes in the width of boards or strips during the sawing or cutting also reveal the state of the saw blades or similar cutter blades, so that these can be replaced at the right moment.

BRIEF DESCRIPTION OF THE SEVERAL VIEWS OF THE DRAWING

The method of the invention is described in greater detail below with reference to the accompanying drawing.

DETAILED DESCRIPTION OF THE INVENTION

Figure 1:
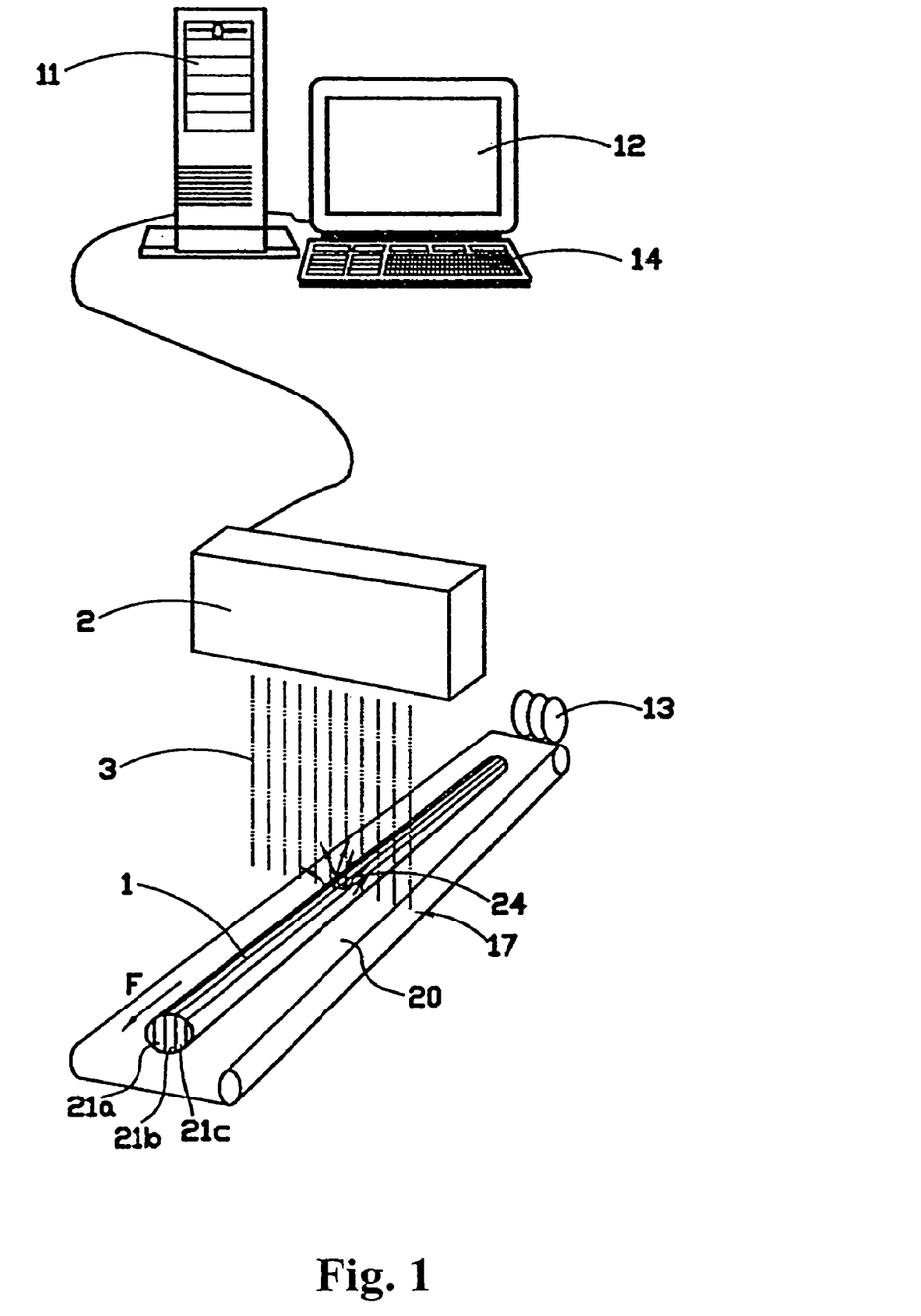
FIG. 1 shows the apparatus and the measuring conditions of the invention in its general aspect and as a perspective projection.
Figure 2:
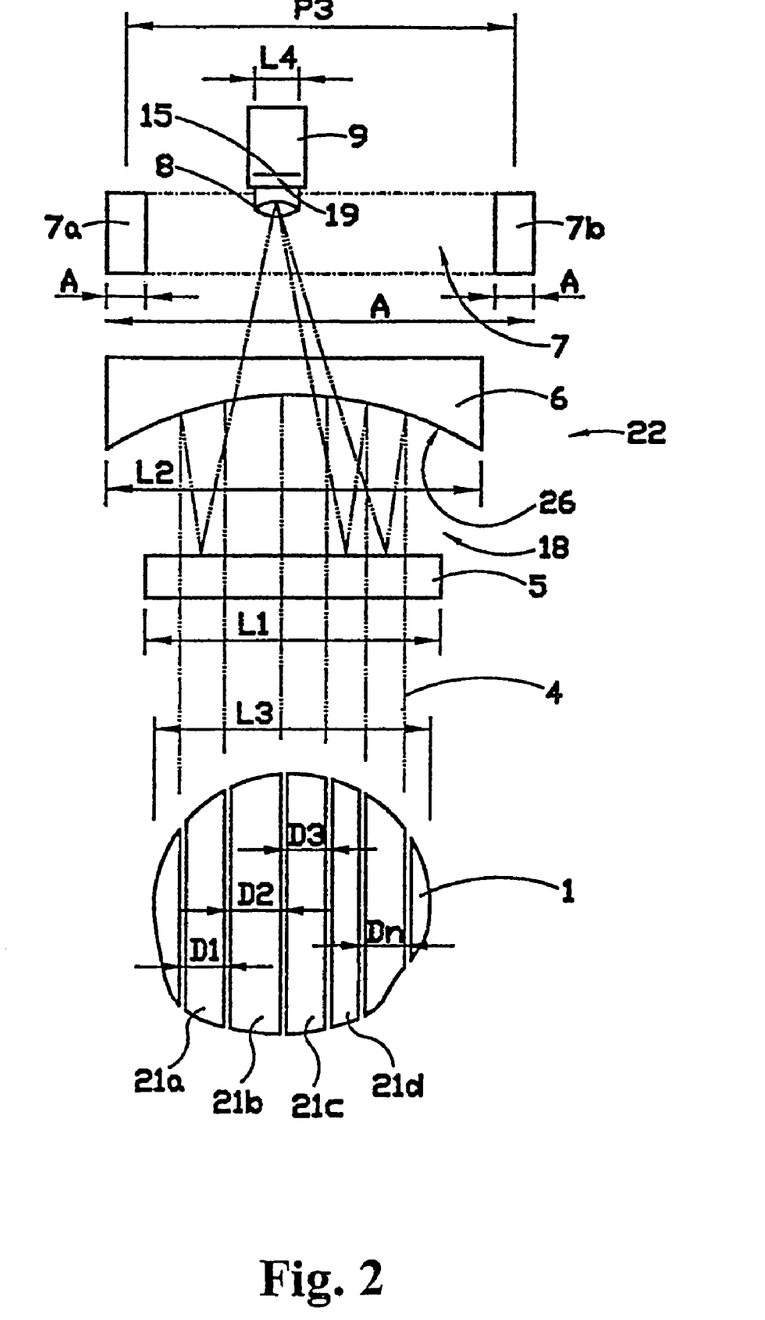
FIG. 2 shows the telecentric imaging system of the invention as a front view in direction I of FIGS. 1 and 3 and its operation in connection with radiation reflected from a log, and also one embodiment of the light source of the invention with an unbroken line, and a second embodiment of this with a line of dots and dashes.

FIG. 1 shows an application of the apparatus of the invention. In the figure, the light 3 comes from a box 2 containing an apparatus 22 comprising a camera and a light source which illuminates boards 21a, 21b, 21c etc. sawn from a log which constitutes the object 1 to be monitored and measured, the boards moving on a conveyor belt 20 in direction F, which is typically perpendicular to the length L1 of the concave curved mirror 6 of the invention and to the length L4 of the linear CCD cell, i.e. the row 15 of photosensitive cells or diodes. The camera 9 in the box 2 images the sawn boards and transmits the data in digital form to the computer 11, which calculates the results, i.e. the widths or dimensions D1, D2, D3 etc. of the boards and displays them on the terminal screen 12. The sawmachine operators see the results, which enables them to control the saw blades 13 so as to achieve an optimal board width. The results also enable them to conclude the state of the saw blades and to replace them before they suffer too much damage or even break. Using the keyboard 14, the operators may feed the computing parameters into the computer. FIG. 2 shows how the light sources 7 illuminate the sawn boards 21a, 21b, 21c, etc. from above. Rays 4 parallel with the optical axis of the concave curved mirror 6 emanate in alignment to the curved mirror 6 of the invention from the light 24 reflected from the sawn boards, whose upper surfaces are diffusingly reflecting and irregularly spaced both from the light source and from the telecentric imaging means 18, the rays 4 being reflected in one embodiment of the invention from the curved mirror 6 to a plane mirror 5, and from there to a camera 8. The aperture of the camera objective 8 is located in the focal plane 10 of the curved mirror 6 or in the immediate vicinity of this, thus providing a telecentric imaging system. The conventional, yet high-quality objective 8 of the camera 9 forms an image of the object 1 on the surface of the row 5 of photosensitive cells of the CCD cell, this surface forming the image plane 19. When the object 1 is at less than an infinite distance from the telecentric imaging means 18, the object must be focused in order to form a sharp image on the image plane 19, and this is usually done in the ordinary way by increasing the distance between the objective 8 and the image plane 19.

An apparatus 22 based on a telecentric imaging system for forming an image of a linear zone 17 of the object 1 usually comprises firstly a non-telecentric camera 9 consisting of an objective 8 and an image plane 19 formed of a row 15 of photosensitive cells. Secondly, the apparatus 22 comprises telecentric imaging means 18 between the objective and the object, the imaging means comprising a concave strip mirror 6, which is substantially parallel with said cell row, with said objective aperture located in the focal plane or the immediate vicinity of the strip mirror, the concave strip mirror and the objective forming jointly a telecentric image of the object on the row of photosensitive cells. For the apparatus based on a telecentric imaging system to function, it must also comprise a suitable light source, which is generally denoted with reference numeral 7 and which emits radiation 3 towards the object.

Figure 3:
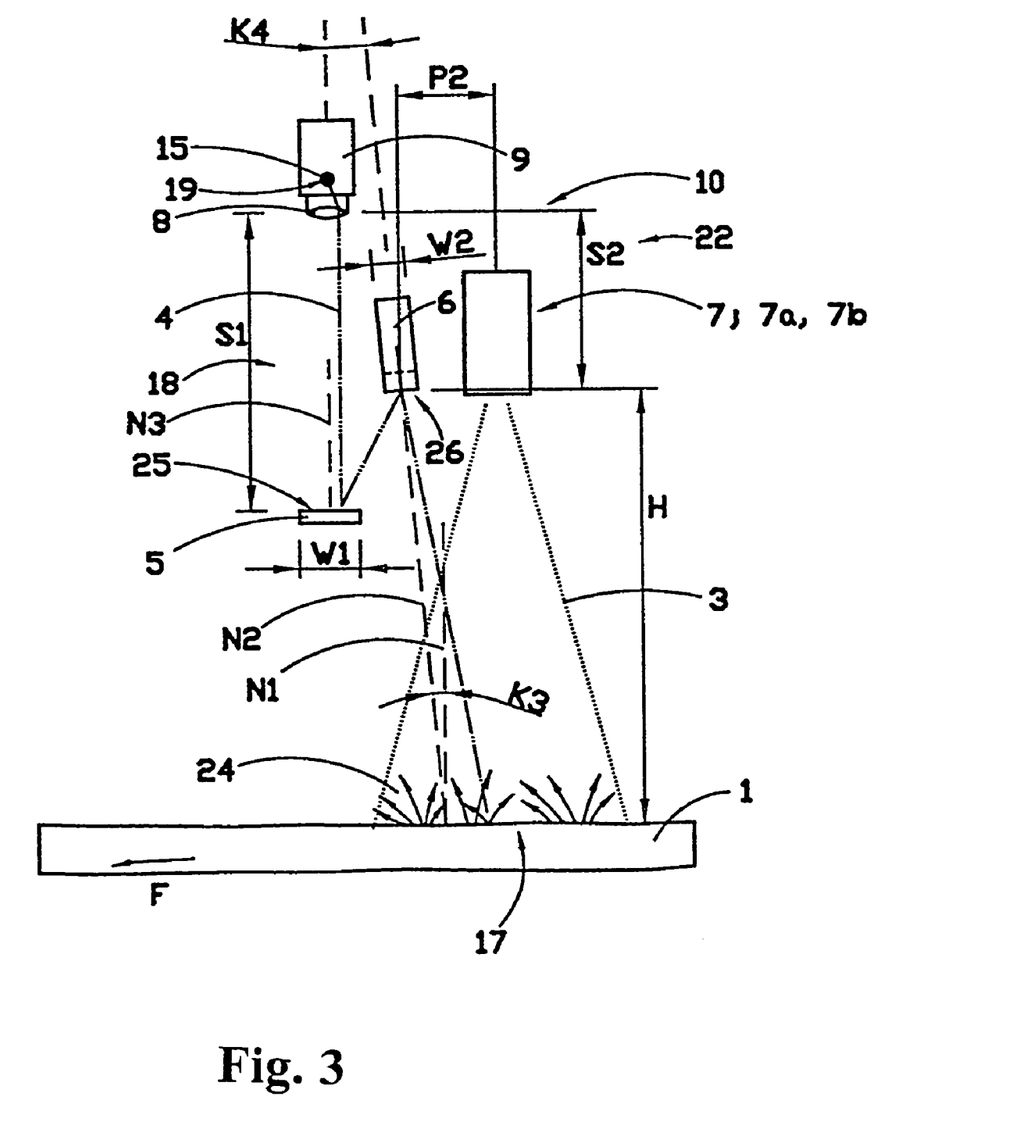
FIG. 3 is a side view of the telecentric imaging system of FIG. 2 in direction II of FIG. 2.
Figure 4:
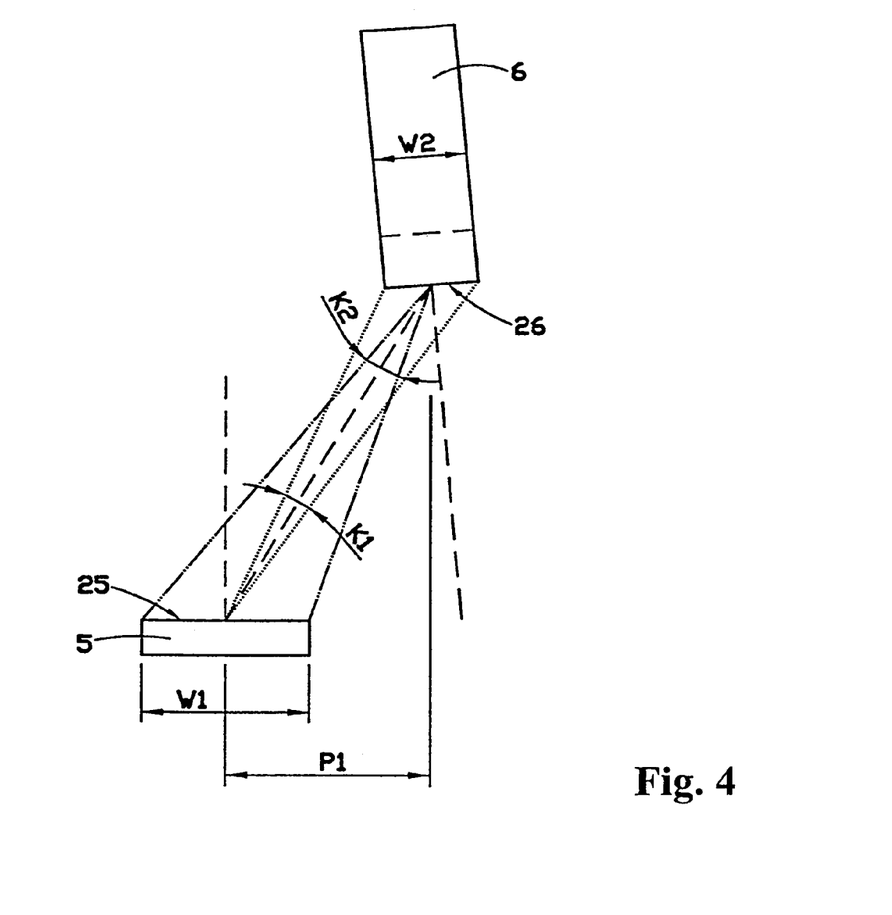
FIG. 4 shows the telecentric imaging system of FIG. 3 on a larger scale and with the mirror positions exaggerated, but otherwise in the same projection as in FIG. 3.

In accordance with the invention, said concave strip mirror of the apparatus 22 described above is one parabolic mirror 6, which means a mirror having in one first direction the form of a parabola and in a direction perpendicular to said first direction either the form of a parabola or an other form, such as the form of a straight line, a part of a circle, another curve or broken line, such as the combination of straight lines or curves continuing in an angle to each other. This parabolic mirror reflects the radiation emitted from the object either to a planar mirror or directly to the camera objective. According to one embodiment of the invention, one parabolic mirror 6 is a strip-like parabolic mirror, i.e. a rotation parabola working as described above. According to another embodiment of the invention, one parabolic mirror 6 has in said other direction a V-form, i.e. it is formed from two planar parabolic mirrors forming an angle with each other, said angle being dimensioned so that focus of both planar parabolic mirrors are combined so that the mirror works according to the invention as a uniform mirror reflecting the radiation emitted from the object as one reflection either to a planar mirror or directly to the camera objective. In a preferred embodiment of the invention, said concave strip mirror is a planar parabolic mirror 6, implying a concave mirror whose reflective surface 26 has a parabolic shape in the direction L2 of the mirror length and a planar shape in the width direction W2 perpendicular to this. In principle, the objective 8 of the camera 9 can be placed directly in the area of the focal plane of such a parabolic mirror or a planar parabolic mirror respectively, however, in a preferred embodiment of the invention, the telecentric imaging means 18 also comprise a strip-like plane mirror 5 between said parabolic mirror/planar parabolic mirror 6 and the objective 8, the directed radiation 4 reflected from the object 1 and the parabolic mirror striking the objective 8 and further the image plane 19. The lengths L2 and L1 of said strip-like parabolic mirror/planar parabolic mirror 6 and the strip-like plane mirror 5 are mutually parallel and parallel with the row 15 of photosensitive cells forming the image plane. When, in addition, the reflective surface 25 of the plane mirror 5 and the reflective surface 26 of said parabolic mirror/planar parabolic mirror 6 are directed towards each other such that the width W1 and W2 of each is reflected from both the reflective surfaces at a predetermined angle K1, K2, the rays 4 reflected from the object and passing through the telecentric imaging means 18 form a reciprocating path as shown in FIGS. 2 and 3, the mechanical length of the telecentric imaging means 18 accounting for only part of the optical length. The use of a parabolic mirror 6, or advantageously of a planar parabolic mirror 6, ensures a sharp image over the entire width L3 of the object, because the telecentric imaging uses only parallel rays reflected from the object 1, so that the weak points of a mirror with a parabolic shape have no impact on the control of rays having another direction.

In the application mentioned in the beginning, the optical distance between a concave parabolic mirror/planar parabolic mirror 6 and the objective 8 may be e.g. 1,500 mm, thus equalling the focal distance of the mirror 6. Using the plane mirror 5 the mechanical length of the apparatus can be reduced even to half of the focal distance if the parabolic mirror/planar parabolic mirror 6 is placed next to the camera 9, however, a slightly smaller diminution of the mechanical length will often be sufficient. The mechanical distance S1 of the strip-like plane mirror 5 from the objective is typically at least 1.5 times the mechanical distance S2 of the planar parabolic mirror 6 from the objective. As noted above, rays are reflected from the sawn boards in other directions as well, however, owing to the telecentric imaging means 18, they will not strike the camera objective 8, because only parallel rays 4 strike the focus/focal plane of the mirror 6.

The length L2 of the parabolic mirror/planar parabolic mirror 6 must be greater than the width L3 of the object 1 to be inspected, and thus the length L2 of the mirror varies notably depending on the object of application. In the application mentioned above, the length L2 of the concave mirror 6 may be e.g. 500 mm or typically more, but with the reflective surface 26 of the concave mirror shaped as in the invention, no substantial imaging errors will occur. This allows measurement of even quite a wide object or at least one dimension D1 and/or D2 and/or D3 . . . . Dn of the width parts of a wide object. The length L2 of a strip-like parabolic/planar parabolic mirror 6 is substantially greater than its width W2. The widths W1 and W2 of the mirrors 5, 6 must be such that the image formed of them on the surface of the row 15 of photosensitive elements is wider than the width of the photosensitive elements. If the mirrors are too narrow, their positioning will be difficult as well. Consequently, the approximate value of 20 mm is considered advantageous as widths W1, W2 of the mirrors, this value being about four times the size of some photosensitive elements. This width still implies a parabolic mirror/planar parabolic mirror 6 which is sufficiently narrow not to be unnecessarily heavy.

To allow for reciprocating movement of the light rays 4 first to the parabolic mirror/planar parabolic mirror, from there to the plane mirror, and from there on to the camera 9, the plane mirror 5 and the parabolic mirror/planar parabolic mirror 6 are spaced by a distance P1 perpendicular to their length L1 and L2, the distance being at least equal to half of the combined width W1+W2 of these mirrors and at the most five times the combined width W1+W2 of these mirrors. In addition, the normal N2 to the reflective surface 26 of the strip-like parabolic mirror/planar parabolic mirror is at an angle K3 with the normal N1 to the object, the angle being 30° at the most, preferably 20° at the most, and the angle K4 between the normals N2 and N3 to the reflective surfaces 26 and 25 of the parabolic mirror/planar parabolic mirror, respectively, being 30° at the most, preferably 15° at the most. Under these criteria, the rays 4 passing through the telecentric imaging means 18 deviate from the direction of the optical axis to such a small extent that no substantial or disturbing imaging errors will occur. At the same time, by meeting these conditions, a compact apparatus 22 is provided.

Figure 5A:
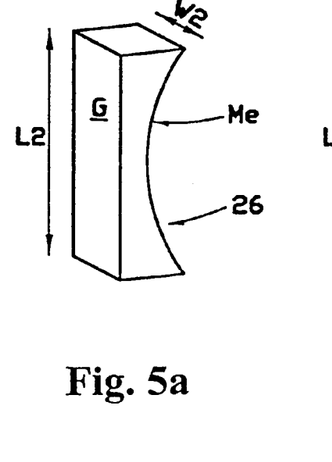
FIGS. 5A–5C are axionometric views of different design options of the mirrors used in the telecentric imaging system of the invention.
Figures 5B, 5C:
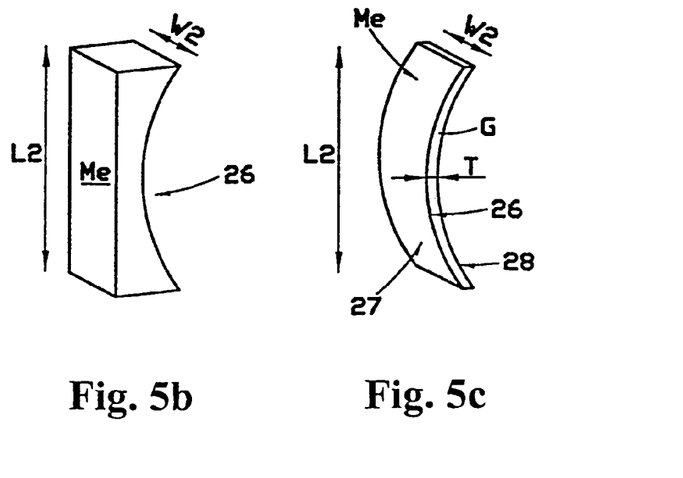

In order to avoid imaging errors as efficiently as possible and thus to eliminate any need for correcting them, the reflective surfaces 26, 25 of the strip-like parabolic mirror or the planar parabolic mirror 6, respectively, and the strip-like plane mirror 5, are preferably metal surfaces which are open on the reflecting side, and thus the rays 4 passing through the telecentric imaging means 18 will not have to pass through glass or plastic layers with at least a substantial thickness, which would generate at least dispersion. The coating of reflective metal Me can be carried out on a correctly shaped concave parabolic surface of glass or plastic G, as in FIG. 5A. This does not prevent the reflective metal surface 25, 26 from being coated with a thin e.g. anti-corrosive layer, or the reflective metal surface 25, 26 from being formed on the convex rear surface 27 of a thin glass or plastic body 23 which is pervious to radiation, with the concave mirror directed in the opposite direction. This latter option is also applicable provided that the thickness T of the glass body or plastic body 23 is very small relative to the focal distance and length of the concave mirror, and also is uniform or almost uniform, i.e. that both the surfaces 27, 28 forming the length and the width L2 and W2 or L1 and W1, respectively, are aligned point by point, as shown in FIG. 5C. It is difficult to make mirrors with such a length from glass G. Thus the recommended material is metal, such as aluminum, copper or steel, with the mirror made entirely of metal Me as in FIG. 5B. Among these, aluminum and copper are easiest to work. On the other hand, copper restricts the area of the visible spectrum starting from 600 nm upwards. In other words, if the entire spectral area is to be utilized, aluminum is the most recommendable.

In accordance with the invention, the light source 7 is a scattered light source which is independent of the telecentric imaging means and is located adjacent to the telecentric imaging means 18 at a distance P2 transverse to the direction of movement of the radiation 4 passing through them. Said transverse distance P2 between the scattered light source and the imaging means 18 is substantially smaller than the distance H between the parabolic mirror or the planar parabolic mirror 6 and the object 1. Said scattered light source comprises preferably two or more lamps 7a, 7b having a substantial area A, as indicated with unbroken lines in FIG. 2.

Then these more than one lamps 7a and 7b are spaced by distances P3 parallel with the length L2 of the parabolic mirror or planar parabolic mirror principally over the width L3 of the object, with a view to provide a substantially homogenous scattered light at the object 1, whereby also the object is reflecting scattered light by means of which the object is evaluated in the arrangement of the invention. Such lamps are available and are also inexpensive. Optionally one single lamp 7 can be used, provided that it is of the type having a length approximate to or exceeding the width of the object, as shown with lines of dots and dashes in FIG. 2, in order to provide a substantially homogenous scattered light 3 at the object 1. The scattered light source 7 is thus emitting radiation to that surface of the object 1 which is turned towards the direction of the telecentric imaging means 18, whereby scattered light reflected from the object is received by the telecentric imaging means 18 according to the invention and the camera 9.

The apparatus 22 of the invention functions as follows in order to form a telecentric image of an oblique object 1 located on an oblique and non-reflective substrate 20. First, scattered light 3 is allowed to be directed from the light source 7 or the light sources 7a, 7b to the object 1 over its entire width L3 to be inspected. Radiation 24 reflected from the object is collected with a strip-like parabolic mirror or planar parabolic mirror 6, the focal plane of which is located substantially at the objective aperture of the camera 9. The collected mainly unidirectional radiation bundle 4 is allowed to be reflected from the concave mirror as a bundle of rays 4, first to the plane mirror 5, and from there to the camera 9, where the bundle of rays proceeds via the objective 8 to the row 15 of photosensitive cells, where an undistorted telecentric image is formed. Then the concave strip-like parabolic mirror or planar parabolic mirror and the objective together form a telecentric image of the linear strip 17 of the object on the row of photosensitive cells.

In addition, in this method, the object 1 is allowed to move F in a direction substantially perpendicular to said linear strip 17, and meanwhile, the photosensitive diodes on the image plane 19 are used to measure the values of at least one or more dimensions D1 and/or D2 and/or D3 . . . Dn of the object. These dimensions are at least partly parallel with said linear strip 17 and the row 15 of photosensitive cells.

The object 1 may consist of a log of timber, a metal sheet or any similar elongated body not having straight edges, which is moved by a transport base 20, and which is worked into one or more strips 21a, 21b, 21c etc. having a width less than the original width. By measuring the undistorted telecentric image as described above the dimensions D1 and/or D2 and/or D3 . . . Dn of said strips to be worked are controlled. With a view to this measurement and the output described above, the photosensitive cells of the camera 9, such as suitable diodes or the CCD cell proper, generate electric signals of the received radiation data, and the signals are transmitted to the processor of the computer 11. The computer writes out the analyzed signals either on a display 12, or they are used in some otherwise suitable manner for controlling the manufacture.

What is claimed is:

1. An apparatus based on a telecentric imaging system for forming an image of a linear zone of an object, the apparatus comprising:

a non-telecentric camera comprising an objective and an image plane formed of a row of photosensitive cells;

telecentric imaging means placed between the objective and the object, said telecentric imaging means comprising a concave strip mirror, said concave strip mirror substantially aligned with said row of cells, and the aperture of said objective being located in the focal plane of the concave strip mirror, the concave strip mirror and the objective jointly forming a telecentric image of the object on the row of photosensitive cells;

a light source producing radiation directed to the object, wherein said concave strip mirror is a planar parabolic mirror; and a strip-like fully reflective plane mirror disposed between said parabolic mirror and the objective, through which the directed radiation reflected from the object and the parabolic mirror strikes the objective and then the image plane in order to obtain a sharp image of the width parts of the object;

wherein the lengths (L2 and L1) of said strip-like planar parabolic mirror and strip-like plane mirror are mutually aligned and aligned with the row of photosensitive cells forming the image plane; and that the reflective surfaces of the strip-like plane mirror and said strip-like planar parabolic mirror are directed towards each other such that the width of each is reflected from the reflective surface of both at a predetermined angle;

wherein the distance of the strip-like plane mirror from the objective is at least 1.5 times the distance of the planar parabolic mirror from the objective; and that the plane mirror and the planar parabolic mirror are mutually spaced by a distance perpendicular to their length, the distance being at least equal to half of the combined width of these mirrors and at the most five times the combined width of these mirrors.

2. The apparatus as defined in claim 1, wherein the length of the strip-like planar parabolic mirror is substantially greater than its width; and that at least the length of the planar parabolic mirror is greater than the width of the object to be observed.

3. The apparatus as defined in claim 1, wherein the reflective surface of the planar parabolic mirror, and the strip-like plane mirror is a metal surface which is open at the reflection side.

4. The apparatus as defined in claim 1, wherein the light source is a scattered light source which is independent of the telecentric imaging means and is located adjacent to the telecentric imaging means at a distance transverse to the direction of movement of the radiation passing through them, whereby said imaging means receive scattered light reflected from the object.

5. The apparatus as defined in claim 4, wherein said transverse distance of the scattered light source is substantially smaller than the distance between the planar parabolic mirror and the object; and that said scattered light source comprises one or more lamps having a substantial area, the more than one lamps being mutually spaced principally over the width of the object by distances parallel with the length of the planar parabolic mirror in order to provide a substantially homogenous scattered light at the object.

6. The apparatus as defined in claim 1, wherein the normal to the reflective surface of the strip-like planar parabolic mirror is at a maximum 30° angle relative to the normal to the object, and that the angle between the normals to the reflective surfaces of the planar parabolic mirror and the plane mirror is 30° at the most.

7. An apparatus based on a telecentric imaging system for forming an image of a linear zone of an object, the apparatus comprising:
   a non-telecentric camera comprising an objective and an image plane formed of a row of photosensitive cells;
   telecentric imaging means placed between the objective and the object, said telecentric imaging means comprising a concave strip mirror, said concave strip mirror substantially aligned with said row of cells, and the aperture of said objective being located in the focal plane of the concave strip mirror, the concave strip mirror and the objective jointly forming a telecentric image of the object on the row of photosensitive cells;
   a light source producing radiation directed to the object, wherein said concave strip mirror is a planar parabolic mirror; and
   a strip-like fully reflective plane mirror disposed between said parabolic mirror and the objective, through which the directed radiation reflected from the object and the parabolic mirror strikes the objective and then the image plane in order to obtain a sharp image of the width parts of the object;
   wherein the lengths (L2 and L1) of said strip-like planar parabolic mirror and strip-like plane mirror are mutually aligned and aligned with the row of photosensitive cells forming the image plane; and that the reflective surfaces of the strip-like plane mirror and said strip-like planar parabolic mirror are directed towards each other such that the width of each is reflected from the reflective surface of both at a predetermined angle;
   wherein the normal to the reflective surface of the strip-like planar parabolic mirror is at a maximum 30° angle relative to the normal to the object, and that the angle between the normals to the reflective surfaces of the planar parabolic mirror and the plane mirror is 30° at the most.

8. The apparatus as defined in claim 7, wherein the distance of the strip-like plane mirror from the objective is at least 1.5 times the distance of the planar parabolic mirror from the objective; and that the plane mirror and the planar parabolic mirror are mutually spaced by a distance perpendicular to their length, the distance being at least equal to half of the combined width of these mirrors and at the most five times the combined width of these mirrors.

9. The apparatus as defined in claim 8, wherein the normal to the reflective surface of the strip-like planar parabolic mirror is at a maximum 30° angle relative to the normal to the object, and that the angle between the normals to the reflective surfaces of the planar parabolic mirror and the plane mirror is 30° at the most.

10. The apparatus as defined in claim 7, wherein the length of the strip-like planar parabolic mirror is substantially greater than its width; and that at least the length of the planar parabolic mirror is greater than the width of the object to be observed.

11. The apparatus as defined in claim 7, wherein the reflective surface of the planar parabolic mirror, and the strip-like plane mirror is a metal surface which is open at the reflection side.

12. The apparatus as defined in claim 7, wherein the light source is a scattered light source which is independent of the telecentric imaging means and is located adjacent to the telecentric imaging means at a distance transverse to the direction of movement of the radiation passing through them, whereby said imaging means receive scattered light reflected from the object.

13. The apparatus as defined in claim 12, wherein said transverse distance of the scattered light source is substantially smaller than the distance between the planar parabolic mirror and the object; and that said scattered light source comprises one or more lamps having a substantial area, the more than one lamps being mutually spaced principally over the width of the object by distances parallel with the length of the planar parabolic mirror in order to provide a substantially homogenous scattered light at the object.

14. An apparatus based on a telecentric imaging system for forming an image of a linear zone of an object, the apparatus comprising:
   a non-telecentric camera comprising an objective and an image plane formed of a row of photosensitive cells;
   telecentric imaging means placed between the objective and the object, said telecentric imaging means comprising a concave strip mirror, said concave strip mirror substantially aligned with said row of cells, and the aperture of said objective being located in the focal plane of the concave strip mirror, the concave strip mirror and the objective jointly forming a telecentric image of the object on the row of photosensitive cells;
   a light source producing radiation directed to the object, wherein said concave strip mirror is a planar parabolic mirror; and
   a strip-like fully reflective plane mirror disposed between said parabolic mirror and the objective, through which the directed radiation reflected from the object and the parabolic mirror strikes the objective and then the image plane in order to obtain a sharp image of the width parts of the object;
   wherein the light source is a scattered light source which is independent of the telecentric imaging means and is located adjacent to the telecentric imaging means at a distance transverse to the direction of movement of the radiation passing through them, whereby said imaging means receive scattered light reflected from the object; wherein said transverse distance of the scattered light source is substantially smaller than the distance between the planar parabolic mirror and the object; and that said scattered light source comprises one or more lamps having a substantial area, the more than one lamps being mutually spaced principally over the width of the object by distances parallel with the length of the planar parabolic mirror in order to provide a substantially homogenous scattered light at the object.

15. The apparatus as defined in claim 14, wherein the normal to the reflective surface of the strip-like planar parabolic mirror is at a maximum 30° angle relative to the normal to the object, and that the angle between the normals to the reflective surfaces of the planar parabolic mirror and the plane mirror is 30° at most.

16. The apparatus as defined in claim 14, wherein the lengths (L2 and L1) of said strip-like planar parabolic mirror and strip-like plane mirror are mutually aligned and aligned with the row of photosensitive cells forming the image plane; and that the reflective surfaces of the strip-like plane mirror and said strip-like planar parabolic mirror are directed towards each other such that the width of each is reflected from the reflective surface of both at a predetermined angle.

17. The apparatus as defined in claim 16, wherein the distance of the strip-like plane mirror from the objective is at least 1.5 times the distance of the planar parabolic mirror from the objective; and that the plane mirror and the planar parabolic mirror are mutually spaced by a distance perpendicular to their length, the distance being at least equal to half of the combined width of these mirrors and at most five times the combined width of these mirrors.

18. The apparatus as defined in claim 17, wherein the normal to the reflective surface of the strip-like planar parabolic mirror is at a maximum 30° angle relative to the normal to the object, and that the angle between the normals to the reflective surfaces of the planar parabolic mirror and the plane mirror is 30° at the most.

19. The apparatus as defined in claim 16, wherein the normal to the reflective surface of the strip-like parabolic mirror is at a maximum 30° angle relative to the normal to the object, and that the angle between the normals to the reflective surfaces of the planar parabolic mirror and the plane mirror is 30° at the most.

20. The apparatus as defined in claim 16, wherein the reflective surface of the planar parabolic mirror and the strip-like plane mirror is a metal surface which is open at the reflection side.

21. The apparatus as defined in claim 14, wherein the length of the strip-like planar parabolic mirror is substantially greater than its width; and that at least the length of the planar parabolic mirror is greater than the width of the object to be observed.

* * * * *